Patented Aug. 27, 1946

2,406,420

UNITED STATES PATENT OFFICE 2,406,420

MANUFACTURE OF STABLE ALUMINA AND IMPREGNATED ALUMINA CATALYSTS

Harry B. Weiser, Houston, Tex., and Elgene A. Smith, Media, and Johnstone S. Mackay, Prospect Park, Pa., assignors to Houdry Process Corporation, Wilmington, Del., a corporation of Delaware No Drawing. Application July 5, 1941, Serial No. 401,268

8 Claims. (Cl. 252—250)

1

The use of active alumina as a catalyst, as a component of a catalyst, or as a base or carrier upon which to place or deposit various materials possessing catalytic activity, is known. Contact masses made up partly or wholly of alumina promote or assist many organic reactions, such as aromatization, dehydrogenation of hydrocarbons, dehydration of alcohols, etc. In contacting operations, it is usually preferable to have the contact material in pellet or granular form in order to permit substantial uniformity in the distribution of reactants and for the control of reaction conditions. Hence the ability of a catalyst to resist breakdown into smaller particles during use is an extremely important factor in the economical operation of commercial plants.

An indication of ability to resist disintegration into powder as well as of the relative strengths of various pellets may be obtained by testing the pellets, preferably after they have been subjected to the heat treatment required for activation of the alumina. One test consists in applying a weighted knife edge, such as used in weight balances, to the center of the outside surface of a pellet, perpendicular to the axis. The pellets employed in this test are in a plug form, 4 mm. in diameter. Another test to indicate strength or hardness is to apply pressure to the diagonal edges of a pellet to create a shearing force as opposed to the cutting or breaking force of the first method. For accuracy in comparative hardness tests it is essential that the pellets be dry, for absorption of moisture gives lower readings.

Since the commercially available alumina pellets and grains were found to be too weak for satisfactory service over extended periods and under certain conditions of use, an extensive and intensive study was made to develop a better product. It was found that hardness seems to depend upon relative quantities and distribution in the freshly precipitated alumina of at least two forms or kinds of its hydrates. A high percentage of $\alpha$ alumina trihydrate, as 30% or more, always gives weak pellets. The sodium content of the finished pellets also seems to influence their stability under the conditions of use. Hence the present invention involves not only greatly improved alumina contact masses but also methods of controlling the content and distribution of the various forms of alumina by the manner of precipitation and subsequent treatment.

The new developments constituting the present invention result from the following observations. When alumina is precipitated rapidly, as by the addition of a precipitating reagent, the particles consist of unstable hydrous $\gamma Al_2O_3.H_2O$. While this invention does not rest on the following analysis, it is offered as a possible mechanism of

2 the action. Two things may happen to the unstable hydrous $\gamma Al_2O_3.H_2O$: (1) It may be transformed into the larger crystals of the more stable $\alpha Al_2O_3.3H_2O$ (this change is known to take place easily if the precipitate is aged at room temperature, especially after washing); or (2) the crystals of $\gamma Al_2O_3.H_2O$ may become "stabilized" (presumably by growth into larger crystals) until the speed of transformation into the $\alpha$ form becomes negligibly slow. If only a small amount of the trihydrate is formed, the few particles of the latter are of necessity surrounded by many particles of the monohydrate. Apparently such an optimum mixture of $\gamma$—$Al_2O_3.H_2O$ particles upon and around the $\alpha$—$Al_2O_3.3H_2O$ particles gives the hardest and most stable mass. If the transformation goes too far trihydrate will predominate and the pellets made therefrom will be softer and less stable.

After the pellets have been formed, heat treatment of the same at temperatures above those required for drying, as at elevated temperature for activation, decomposes $\gamma$—$Al_2O_3.H_2O$ to give $\gamma$—$Al_2O_3$; while $\alpha$—$Al_2O_3.3H_2O$ decomposes to give $\gamma$—$Al_2O_3$ also. However, X-ray analyses show that the crystals of $\gamma$—$Al_2O_3$ from $\alpha$—$Al_2O_3.3H_2O$ are distinctly larger than those from $\gamma$—$Al_2O_3.H_2O$ when decomposed under the same conditions. Pellets from $\alpha Al_2O_3.3H_2O$ alone when heat treated are softer and less stable than pellets from a mixture of the two hydrates. Hence for the hardest pellets, a mixture containing a high per cent of $\gamma$—$Al_2O_3.H_2O$ is required before heat treatment.

Suitable mixtures of $$\gamma Al_2O_3.H_2O \text{ and } \alpha Al_2O_3.3H_2O$$

can be obtained in a relatively short time by stabilizing the alumina by the use of heat. This step, which we designate "hot aging" apparently speeds up the second reaction of the unstable $\gamma Al_2O_3.H_2O$ mentioned above to a much greater extent than the first, and thus results in the formation of a mixture of a small amount of stable $\alpha Al_2O_3.3H_2O$ and a larger amount of "stabilized" $\gamma Al_2O_3.H_2O$. Following the "hot aging" period, which extends up to two hours, and longer if desired, with temperatures in the range of about 125 to about 212° F. at atmospheric pressure, the precipitate is filtered and dried. The "hot aging" can be conducted at higher temperatures by employing superatmospheric pressure. The dried precipitate is then subjected to a thorough washing to remove soluble salts, etc. This operation may be speeded up by using a centrifuge or rotary filter. The resulting filter cake is dried and then ground in suitable pulverizing equipment such as a ball mill, hammer mill, etc., to a desired degree of fineness, the length of the grinding determining somewhat the hardness of the pellets. The ground mass can be formed in regular or irregular pieces of any desired shape. It may be cast, extruded or pressed into pellet form, as into solid cylindrical pieces of two to four millimeter diameter. The pellets or pieces are then subjected to heat treatment at 1000° F. or above, as up to about 1600° F.

EXAMPLE 1

Precipitation of hydrous alumina from a solution of sodium aluminate was effected by adding a solution of ammonium chloride, the resulting slimy thick mass being then promptly heated into the temperature range of 125° to 212° F. as up to about 165° F. It was held at this temperature for about two hours. The mixture was then filtered and dried. The dried material was subjected to ten water washes to remove soluble sodium and ammonium salts. Filtering and drying followed and the resulting dried filter cake was broken and ground in a ball mill for about three hours. Sufficient wetting material, for example, water somewhat in excess of a 1:1.7 weight ratio was added to the powder to produce a mass of doughy consistency which was forced into apertured plates designed to produce 4 mm. cast pellets. After drying at room temperature or baking at a temperature of about 275° F. the pellets were knocked out of the plates and heat treated at about 1400° F. The pellets were very resistant to disintegration. Batches made with minor variations in details of procedure gave pellets after final heat treat having hardness by the knife edge test ranging from 3500 to about 12,000 grams.

EXAMPLE 2

Precipitation of hydrous alumina from a solution of sodium aluminate was effected by the addition of sufficient ammonium chloride solution to give a 1 to 1 equivalent ratio of $NH_4^+$ to $Na^+$. The resulting slimy thick mass was filtered as rapidly as possible and the wet filter cake was immersed immediately in an equal quantity of hot water (180° F.) and the mixture held at that temperature for 20 minutes. The mixture was then filtered and dried. Then followed the same general treatment as in Example 1. The heat treated pellets had a hardness of 5000 grams.

Another batch was not filtered before immersion in hot water but gave a final product of desired stability and about the same hardness.

EXAMPLE 3

The precipitation of hydrous alumina was effected as in the first paragraph under Example 2. It was filtered as quickly as possible and the wet filter cake broken up and one portion subjected to steam to bring the mass to about 165° F. Another portion was subjected to equivalent treatment in a high humidity oven at temperatures up to 225° F. where the filter cake was brought to about 165° F. or above, before appreciable drying took place, the humidity of the oven being thereafter gradually decreased and the drying finished at about 200° F. The treatment thereafter for both batches followed that of Example 1. Finished heat treated pellets from both portions or batches had knife edge hardness of approximately 4200 grams.

EXAMPLE 4

Solutions of aluminum nitrate and ammonium hydroxide were separately heated into the upper portion of the temperature range of 125 to 212° F., as to about 195° F. and mixed at such temperature so as to effect precipitation at about 180 to 200° F. The precipitate was immediately filtered out and dried. Then followed the same treatment as in Example 1. The pellets after final heat treat had a hardness of 8200 grams.

EXAMPLE 5

Unheated solutions of aluminum nitrate and ammonium hydroxide were mixed and precipitation effected at room temperature. Thereupon the mixture was promptly heated to about 165° F. and held there for about two hours. Subsequent treatment was substantially the same as in Example 1. The hardness of the resulting pellets after final heat treat was 6100 grams.

The "hot aging" should be effected during precipitation or promptly thereafter, as within an hour, for example. If this treatment is delayed until a large quantity of $\alpha Al_2O_3.3H_2O$ is formed, subsequent heating is futile and pellets of desired hardness and stability cannot be produced. The "hot aging" should be conducted preferably with stirring and in the presence of the mother liquor but need not be continued for more than two hours; shorter periods are sufficient in some instances. Experiments indicate that there is little if any change in the precipitate when the heating is continued for extended periods as up to 24 hours.

Any convenient aluminum compound, such as alkali metal aluminates and aluminum salts, may be utilized as the starting material. Either acidic or basic precipitants are used, depending upon the character of the starting material. Suitable acidic precipitants are ammonium chloride, ammonium sulphate, ammonium nitrate, hydrochloric acid, nitric acid, etc. Suitable basic precipitants are ammonium hydroxide, sodium hydroxide and other materials producing ammonia, such as hexin (hexa-methylene tetramine), etc.

The washing of the dried precipitate involves a certain amount of difficulty due to the slimy nature of the precipitate when wet. It is facilitated by the use of centrifuges or rotary filters. Drying is normally effected at about 200° F. in an oven with little air draft, since the dried material takes the form of fairly fine powder which is easily blown about. The grinding of the dried powder is continued for a sufficient time to have at least 95% pass through 200 mesh screen and at least 70% thru 400 mesh screen. In general, and within limits, the extent of the grinding operation determines the hardness of the resulting pellets. It must be emphasized, however, in connection with grinding time and screen analysis, that no amount of grinding or fineness of powder will yield good pellets from inferior material, i. e. material not subjected to the "hot aging" treatment referred to previously.

For casting or extruding operations, a wetting agent such as water, and aqueous mixtures containing ethyl alcohol, acetone, kerosene and the like, may be utilized. When water alone is used, the weight ratio of powder to water ranges from 1.2:1 to 2:1, depending upon the length of the grinding operation, the fineness and nature of the powder. Mixes giving very hard pellets are usually characterized by a pronounced sliminess which makes the mixture very hard to handle. This condition sometimes requires a compromise in hardness of the final pellet to permit greater ease in handling.

The workable doughy mass made by mixing the wetting agent with the powder can be extruded as well as cast. The mass may sometimes exhibit properties which are detrimental to easy extrusion into cylindrical or pellet form. This can be overcome either by adding appropriate foreign agents, such as starch or kerosene, or by drying in thread form without cutting into shorter lengths until after the drying process. For cast pellets metal plates may be provided having perforations of the proper size into which the doughy mass is introduced. After drying, the extruded or cast material will have strengths under the knife edge test ranging from about 1000 to about 9000 grams in 4 mm. plug form. The subsequent heat treatment of the pellets, effected in the temperature range where activation of alumina occurs, namely from 1000 to 1600° F., increases the hardness by the knife edge test to 3500 to 14,000 grams.

Alumina prepared in accordance with the present invention and in the form of 4 mm. pellets, varies in apparent density (weight in kilograms of a liter of pellets) from about 0.6 to about 0.8 kg./l. The higher density pellets result from long grinding of the dried precipitate and from the use of a thick mix. The lower density pellets result from a thin mix. Their water absorptivity measured as weight per cent $H_2O$ (dry pellet basis) runs from about 45 to about 65% and is inversely proportional to the apparent density. A knife edge hardness after heat treatment of at least 3500 grams is requisite for certain commercial uses and desirable for all.

The pellets of the present invention are superior in all respects to the best products of commercial alumina available, as will be apparent from the following comparative table.

Table 1

| Type | Apparent density | Absorptivity wt. per cent $H_2O$ (dry pellet basis) | Sodium content per cent $Na_2O$ | Hardness in grams after activation knife edge method |
|---|---|---|---|---|
| COMMERCIAL ALUMINA | | | | |
| Commercial granular alumina 4 to 8 mesh | 0.86 | Per cent 39 | 0.8 | |
| Commercial machine made 4 mm. pellets | .91 | 33 | 1.7 | 3,140 |
| ALUMINA PELLETS OF PRESENT INVENTION | | | | |
| 4 mm. cast pellets (1st example) | 0.78 | 45 | 0.3 | 11,900 |
| 4 mm. cast pellets (another batch 1st example) | .70 | 57 | .2 | 4,800 |
| Do | .62 | 64 | .3 | 3,600 |
| 4 mm. cast pellets (4th example) | .76 | 50 | .5 | 8,200 |

There are a number of properties which show the improvement resulting from the present invention. In the first place, the increased hardness makes the alumina pellets much less liable to fracture and powdering during use. This advantage is particularly noticeable over commercial alumina in screened sizes made up of irregular chunks. In addition, ability to mold leads to regularity of pellets form permitting even and close packing so that a maximum quantity of catalyst can be disposed in a given reaction chamber.

For compound catalysts using alumina as a base, the usual method of preparation is to immerse the alumina pellets or particles in a solution containing the other constituents as solutes. The alumina absorbs the solution and on drying and decomposition yields the final catalyst. Frequently, the amount of the added constituent is of prime importance in the value of the resulting complex as a catalyst. It is also desirable that the entire amount of the second constituent be deposited in a single operation (i. e. without drying, decomposing, and dipping a second or third time). In this respect the high absorptivity of alumina of the present invention is an extremely desirable property, since it allows the preparation of compound catalysts with a maximum range of quantity of a second constituent. For example, in order to deposit 11% of $MoO_3$ on commercial Activated Alumina, it is necessary to dip twice, while with alumina of the present invention only one dip is necessary. The maximum amount which can be deposited on commercial alumina using ammonium paramolybdate in a single dip is about 7% by weight of the finished catalyst. This single dip advantage extends to all catalytic agents capable of deposition on alumina by means of solutions of soluble compounds. The advantage is still more pronounced in the case of slightly soluble compounds or dilute colloidal solutions of active materials, such as vanadium, tungsten, platinum, silver, iron, etc. For example, from ammonium meta vanadate up to about 1.7% of $V_2O_5$ by weight of finished catalyst can be deposited on the alumina of commerce in a single dip, as compared with approximately 3% which can be obtained in a single dip of the alumina of the present invention.

The purity of the alumina of the present invention is also very important in some instances, as, for example, in alumina molybdenum oxide catalysts. A catalyst of this type which contains appreciable amounts of alkali metal gets very soft during use or heat treatment to 1400° F., while a catalyst made from the essentially pure $Al_2O_3$ of the present invention loses little or none of its hardness. This condition is illustrated in the following table:

Table 2

| Source of $Al_2O_3$ | Percent $Na_2O$ | Percent $MoO_3$ deposited | Hardness in grams knife edge method before heat treat | Hardness in grams—knife edge method after heat treat at 1400° F. for 4 hours |
|---|---|---|---|---|
| Commercial granular 4–8 mesh | .79 | 6.7 | Hard | Soft |
| Commercial alumina 4 mm. machine made pellets | 1.7 | 7 | 3,000 | 189 |
| Do | 1.7 | [1] 8.8 | 3,100 | 700 |
| Cast 4 mm. pellets of present invention | 0.2 | [2] 11.5 | 5,000 | 5,000 |

[1] Two dips.
[2] One dip.

Actual tests of the pellets in Table 2 have been made for extended periods in cyclic operations which involve alternate transformation of hydrocarbons and subsequent regenerating reactions. Commercial pellets disintegrated to powder very quickly, while the pellets of the present invention were found to be practically unaffected after months of continuous use. As a result of this experience, it has been established that the four-hour heat treatment at 1400° F. indicated in the last column of Table 2 is a severe test of the ability of a catalyst to stand up under the conditions of commercial use and is an accurate measure of its practical value.

Among the many uses of the alumina and alumina-supported catalysts of the present invention may be mentioned promotion of reactions involving hydrocarbons including those reactions which produce improved commercial products, such as motor fuels, burning fuels and hydrocarbons of higher carbon-to-hydrogen ratio than the charge, but of substantially the same number of carbon atoms per molecule, as for instance the production of aromatics from naphthenes and paraffins. Further, and by way of example, the disclosed alumina-supported molybdenum oxide catalyst have been used under conditions to produce cracking or dehydrogenation of naphthas to high-octane gasoline, which use results in lower coke make and extended catalyst life as compared with the use of commercial Activated Alumina. Operations of this type are disclosed in the copending application, Serial No. 400,252, filed June 28, 1941, by Peterkin, Bates and Smith.

The property of great hardness and strength possessed by the alumina of the present invention makes its use preferable to ordinary alumina masses of less strength and hardness for preparation of contact masses and for other uses. Any desired material advantageously may be supported thereby or compounded therewith, as for instance metals or compounds thereof such as chromium, cobalt, nickel, uranium, zirconium and the like.

We claim as our invention:

1. Process of preparing alumina of high stability and resistance to disintegration comprising precipitating hydrous alumina from a solution containing an aluminum compound, subjecting the precipitate to "hot aging" for a period of at least ten minutes, at a temperature of above 125° F. to stabilize the alumina, washing the alumina until substantially free of soluble salts, subjecting the washed alumina to a grinding operation until at least 70% of it will pass a 400 mesh screen, forming the ground alumina in pieces for use, and heat treating the pieces so formed at a temperature between 1000° and 1600° F. whereby said pieces are of a hardness such that pellets 4 mm. in diameter prepared by the same process have a knife edge hardness of at least 3500 grams.

2. Process of preparing alumina of high stability and resistance to disintegration comprising precipitating hydrous alumina from a solution containing an aluminum compound, subjecting the precipitate to "hot aging" for a period of at least ten minutes, at a temperature of above 125° F. to stabilize the alumina, washing the alumina until substantially free of soluble salts, drying the alumina, grinding it until at least 95% will pass a 200 mesh screen and at least 70% will pass a 400 mesh screen, mixing the powder with a wetting agent to form a doughy mass, forming the mass into pieces of desired size and shape, and heat treating the pieces so formed at a temperature between 1000° and 1600° F. whereby said pieces are of a hardness such that pellets 4 mm. in diameter prepared by the same process have a knife edge hardness of at least 3500 grams.

3. Process of preparing alumina of high stability and resistance to disintegration comprising precipitating hydrous alumina from a solution containing an aluminum compound while the solution is maintained in heated condition within the temperature range of about 125 to about 212° F., for at least ten minutes freeing the precipitate of soluble salts by alternate washing and filtering operations until its content of alkali metal is at least as low as .5% sodium oxide or equivalent, grinding the purified alumina until at least 70% will pass a 400 mesh screen, forming the ground alumina into pellets or pieces of desired size, and subjecting the latter to heat treatment in the temperature range of 1000 to 1600 F. whereby said pellets or pieces are of hardness such that pellets 4 mm. in diameter prepared by the same process have a knife edge hardness of at least 3500 grams.

4. Process of preparing alumina of high stability and resistance to disintegration comprising precipitating hydrous alumina from a solution containing an aluminum compound by the action of a precipitating agent, subjecting the precipitate to "hot aging" in the temperature range of about 175 to 190° F. for a period of at least ten minutes, freeing the precipitate of soluble salts by alternate washing and filtering operations until its content of alkali metal is at least as low as .5% sodium oxide equivalent, grinding the purified alumina until at least 70% will pass a 400 mesh screen, forming the ground alumina into pellets or pieces of desired size, and subjecting the latter to heat treatment in the temperature range of 1000 to 1600° F., whereby said pellets or pieces are of a hardness such that pellets 4 mm. in diameter prepared by the same process have a knife edge hardness of at least 3500 grams.

5. Process of preparing a compound catalyst of high stability and resistance to disintegration of which the major component is active alumina which comprises precipitating hydrous alumina from a solution containing an aluminum compound, subjecting the precipitate to "hot aging" for a period of at least ten minutes, at a temperature of above 125° F. to stabilize the alumina, washing the alumina until substantially free of soluble salts, grinding the alumina until at least 70% of it will pass a 400 mesh screen, forming the ground alumina in pieces for use, subjecting the pieces to heat treatment in the temperature range of 1000 to 1600° F. to activate the same, compositing another component within the pieces from a solution of a compound of said component, and igniting the pieces to provide the finished catalyst, whereby said pieces are of a hardness such that pellets 4 mm. in diameter prepared by the same process have a knife edge hardness of at least 3500 grams.

6. Process of preparing an alumina-molybdenum oxide catalyst of high resistance to disintegration and having a knife-edge hardness in 4 mm. size of at least 3500 grams which comprises precipitating hydrous alumina from a solution containing an aluminum compound, subjecting the precipitate to "hot aging" at a temperature of about 125 to 212° F. for a period of ten minutes to two hours but sufficient to stabilize the alumina, washing the alumina until substantially free of soluble salts, grinding the alumina until at least 70% of it will pass a 400 mesh screen, forming the ground alumina in pellets of desired size and shape, heat treating the pellets in the temperature range of 1000 to 1600° F. to activate the same, depositing in excess of 7% of molybdenum (determined as MoO$_3$) on said pellets in a single dip, and igniting the pellets to provide the finished catalyst, whereby said pellets are of a hardness such that test size pellets similarly formed and heat treated have a knife edge hardness of at least 3500 grams.

7. Process of preparing alumina of high stability and resistance to disintegration comprising precipitating hydrous alumina from a solution containing an aluminum compound, "hot aging" the hydrous alumina by maintaining the moist precipitate at a temperature above 125° F. while avoiding substantial drying thereof for a time sufficient to stabilize the alumina, washing the alumina until substantially free of soluble salts, subjecting the washed alumina to a grinding operation to produce a finely ground product, forming the resulting ground alumina in pieces for use, and heat treating the pieces so formed at a temperature between 1000° and 1600° F. whereby said pieces are of such hardness that pellets 4 mm. in diameter prepared by the same process, have a knife edge hardness of at least 3500 grams.

8. Process of preparing alumina of high stability and resistance to disintegration comprising precipitating hydrous alumina from a solution containing an aluminum compound, "hot aging" the hydrous alumina by maintaining the moist precipitate at a temperature above 125° F. while avoiding substantial drying thereof for at least ten minutes, washing the alumina until substantially free of soluble salts, subjecting the washed alumina to a grinding operation to produce a finely ground product, forming the resulting ground alumina in pieces for use, and heat treating the pieces so formed at a temperature between 1000° and 1600° F. whereby said pieces are of such hardness that pellets 4 mm. in diameter prepared by the same process, have a knife edge hardness of at least 3500 grams.

HARRY B. WEISER.
ELGENE A. SMITH.
JOHNSTONE S. MACKAY.